Aug. 26, 1924.

D. DOYLE 1,506,165

APPARATUS FOR PREVENTING THEFT OR UNAUTHORIZED USE OF MOTOR VEHICLES

Original Filed April 6, 1920

Inventor
D. Doyle,
By Marks&Clerk
Attys.

Patented Aug. 26, 1924.

1,506,165

UNITED STATES PATENT OFFICE.

DAVID DOYLE, OF SYDENHAM, LONDON, ENGLAND.

APPARATUS FOR PREVENTING THEFT OR UNAUTHORIZED USE OF MOTOR VEHICLES.

Original application filed April 6, 1920, Serial No. 371,705. Divided and this application filed February 16, 1922. Serial No. 537,090.

*To all whom it may concern:*

Be it known that I, DAVID DOYLE, a subject of the King of Great Britain and Ireland, and formerly residing at 49 Pembroke Road, Clifton, Bristol, in the county of Gloucester, England, now residing at 33 Maitland Road, Sydenham, London, S. E., England, have invented a certain new and useful Improved Apparatus for Preventing Theft or Unauthorized Use of Motor Vehicles, of which the following is a specification.

This invention relates to motor vehicles and the present application is a division of my application filed April 6, 1920, Serial No. 371,705.

In connection with such motor vehicles it has hitherto been proposed to secure one or more jacks to the vehicle axle for the purpose of raising the road wheels for tyre removal or for other repairs, but such jacks may be readily removed from the axles and offer no obstacle or hindrance to the theft or unauthorized use of the vehicle.

The object of the present invention is to provide simple and efficient means which may either be fitted during the construction of the vehicle or may be adapted with existing vehicles for preventing the theft or unauthorized use of such vehicles.

The invention consists in the provision in a motor vehicle of a jack for elevating one or more of the driven road wheels out of contact with the road surface combined with means whereby the jack may be locked against unauthorized operation or release when the road wheel has been so raised.

The invention also consists in the apparatus hereinafter described or indicated.

The accompanying drawings illustrate one convenient form of apparatus in accordance with the invention.

In carrying my invention into effect in one convenient manner I provide in conjunction with one of the road driving wheels a jack member $a$ arranged in a casing, which may consist of two parts, one of which $b$ contains or forms or is secured to a clip or the like $c$ secured upon the axle casing $d$, while the other part $e$ is hinged to the first mentioned part as at $f$ and contains the jack which may be of any approved screw or other construction. The jack may be actuated by a worm $g$ and worm wheel $h$ which can be operated by any suitable form of combination key (that is, a key having two or more members in combination adapted respectively to operate or co-operate with two or more parts associated therewith) so that without such key the jack cannot be operated and the combination may be known only to authorized persons or can be provided only by a particular key. Thus, when it is required to secure the car against unauthorized use the key is adapted to actuate the jack so that the driving wheel is lifted out of contact with the road surface and it will be held locked in this position until restored to the normal by the use of the particular key adopted.

Figure 1:
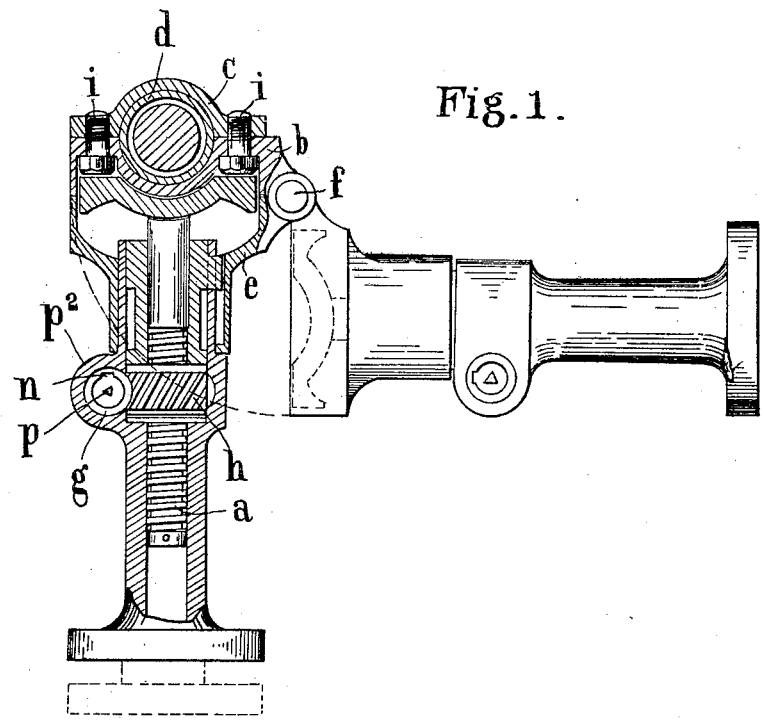
Figure 1 is a part sectional elevation.

In the example illustrated the part $b$ of the casing is secured to the clip member $d$ by set screws $i$ which are inserted from the interior so that when the jack is in the position for elevating shown by the upright part of Figure 1 the studs are rendered inaccessible with the result that the jack cannot be removed bodily from the axle casing.

The hinged part $e$ of the casing may be secured in position when not required in operation by hooking the same (in the horizontal position shown in Figure 1) to some convenient part of the under-frame of the vehicle.

Figures 2, 3, 4:
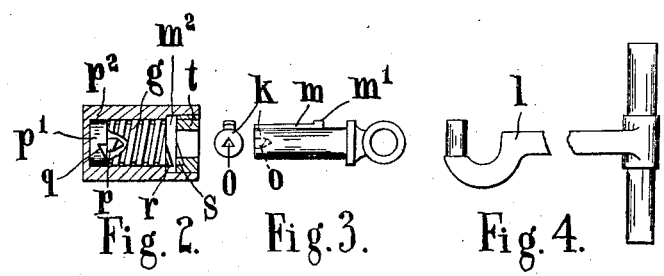
Figure 2 is a view illustrating a detail.
Figure 3 shows one form of key that may be employed with the apparatus of Figures 1 and 2.
Figure 4 is a view of one form of operating handle.

Figure 3 illustrates one form of combination key $k$ which may be employed to actuate the worm, the usual jack handle or lever $l$ being provided in conjunction with the key. The feather $m$ engages a slot $n$ in the worm, while the recess $o$ in the key engages the projection $p$ on the member $p'$ which is freely rotatable in the worm casing $p^2$. When the correct combination key is employed the worm and the member $p'$ both rotate together in both directions either when lifting or lowering the jack and movement of the worm to the right is prevented by the head $m'$ of the feather $m$ engaging the recess $m^2$ (Figure 2) in the worm casing. If, however, the correct key be not employed, the worm may be rotated in the direction for lifting the jack, but when rotated in the reverse direction a pawl on the worm corresponding with the recess $q$ on the (now) stationary member $p$ is forced out of the recess $q$ thus forcing the projection $r$ in the worm into the recess $s$ in the fixed bush or gland $t$ and preventing further rotation of the worm. In this way it is impossible to lower the jack for operation or removal of the vehicle.

It will be understood that the invention is not to be limited to any particular type or construction of jack nor to any particular means for actuating and locking the same as such details may be modified to suit any particular practical requirements that may have to be fulfilled.

Having now described my invention, what I claim as new and desire to secure by Letters Patent is:—

1. In a motor vehicle the combination of a jack carried upon an axle of the vehicle and adapted to assume a vertical position, means for extending the jack when in such vertical position for raising the axle and means for preventing the unauthorized operation of the jack when in such extended condition.

2. In a motor vehicle the combination of an axle, a jack secured thereon and adapted to assume a vertical position, means for extending the jack when in such vertical position for raising the axle, means for preventing the unauthorized operation of the jack when in such extended condition and means for securing the jack upon the vehicle axle so that it may not be removed bodily therefrom when in its extended condition.

3. In a motor vehicle the combination of a jack carried upon an axle of the vehicle and adapted to assume a vertical position, a casing containing said jack comprising two parts, one of which is secured to the axle casing, means for extending the jack when in its vertical position for raising the axle and means for preventing the unauthorized operation of the jack when in such extended condition.

4. In a motor vehicle the combination of a jack carried upon an axle of the vehicle and adapted to assume a vertical position, means for extending the jack when in such vertical position for raising the axle and a combination key adapted to actuate such jack extending means and to be removed after the jacking operation thus locking the jack.

5. In a motor vehicle the combination of a jack carried upon an axle of the vehicle and adapted to assume a vertical position, means comprising a worm for extending the jack when in such vertical position, a casing containing said worm and means within said worm casing for preventing unauthorized operation of the worm in the direction for lowering the jack.

6. In a motor vehicle the combination of a jack carried upon an axle of the vehicle and adapted to assume a vertical position, means comprising a worm for extending the jack when in such vertical position for raising the axle and a rotary member within said worm casing adapted to be rotated with the worm when an appropriate combination key is employed and means for rendering the worm inoperative in the direction for lowering the jack when said combination key is not employed.

In testimony whereof I have signed my name to this specification.

DAVID DOYLE.